United States Patent Office 3,549,616
Patented Dec. 22, 1970

3,549,616
AMINO SUGAR SALTS OF N-CYCLOHEXYL SULFAMIC ACID
Edward McIntosh Acton, Menlo Park, and Carol Walker Mosher, Stanford, Calif., assignors to CPC International Inc., a corporation of Delaware
No Drawing. Filed Jan. 15, 1968, Ser. No. 697,651
Int. Cl. C07c 95/04
U.S. Cl. 260—211
18 Claims

ABSTRACT OF THE DISCLOSURE

This invention covers compositions useful as synthetic sweetening agent. More particularly covers amino sugar salts of N-cyclohexyl sulfamic acid which have excellent sweetening power and exhibit little or no bitter aftertaste. A typical member of the class is the 1-amino-1-deoxy-D-glucitol salt of N-cyclohexyl sulfamic acid.

---

Saccharin (o-sulfobenzoic imide) and cyclamate (inorganic salts of N-cyclohexyl sulfamic acid) have been known for some time as sweetening agents and have found relatively wide acceptance due to their substantial non-caloric character. However, both these materials have one drawback in common, that is, they impart a bitter aftertaste or "off" taste to the majority of people utilizing them. There have been many attempts to form derivatives of these materials which do not possess the objectionable and characteristic bitter aftertaste. Also, various mixtures of the two in varying proportions have been made to at least eliminate some of the "off" taste. To date, however, mixing the two materials or forming derivatives of one or the other has not been completely successful in completely or substantially eliminating the bitter aftertaste.

Another disadvantageous property of the above materials, particularly with respect to cyclamates is their relatively low solubility in water. This is more particularly true of sodium cyclamate which is sparingly soluble in water at low temperature. Calcium cyclamate has somewhat better solubility properties but has a flat aftertaste below about 25° C. This lack of solubility in water leads to obvious difficulties in formulation, use, etc.

It would therefore be a distinct advance in the art if a derivative of one of these materials, say a cyclamate derivative, could be found which possessed little if any of the bitter aftertaste or "off" taste characteristic of the conventional cyclamates. Moreover, if such derivative nevertheless possessed exceptionally high sweetening power, at least equal to or even superior to commercial cyclamates, such product would be a distinct advance in the food art. Again, if the discovered material had the requisite solubility in water whereby it could be sold and utilized in aqueous liquid form of relatively high concentration, the sweetener would find ready acceptance. Lastly, if a new class of cyclamates were known which could be easily and simply prepared in solid form and did not become hygroscopic even after long periods of standing, such derivatives would have even greater versatility in the artificial sweetener field. Of course, these cyclamate derivatives must be psychologically acceptable.

In view of the above, it therefore becomes an object in the invention to provide an improved class of substantially non-caloric sweetening agents.

Another object of the invention is to provide synthetic sweetening agents which exhibit little or no bitter aftertaste.

A still further object of the invention is to provide a family of sweetening agents which have exceptionally high sweetening power, as solids are non-hygroscopic, and have excellent solubility in water.

A still further object of the invention is to provide sweetening agents which are conveniently and economically prepared and yet additionally possess the desired properties enumerated above and others.

Other objects will appear hereinafter.

In accordance with the invention we have discovered a new class of artificial sweetening compositions. These compositions broadly comprise amino sugar salts of N-cyclohexyl sulfamic acid. The materials have excellent sweetening power, impart no bitter aftertaste, have high solubility in water, and in their solid or crystalline form exhibit little or no hygroscopicity.

The salts of the present invention may be easily and conveniently prepared in a liquid, either by first mixing the constituents and adding the admixture to the liquid, or dissolving each of them separately in the liquid solvent. It is greatly preferred, of course, that salts be formed utilizing water as the solvating medium. The resultant aqueous concentrates may contain from say 10% to about 30% by weight of the salt and may be then marketed as such and thus utilized by the consumer. On the other hand, if a solid crystalline salt is preferred, the dissolved salts may be crystallized from water by a variety of known techniques. For example, a water miscible solvent may be added to the aqueous salt solution to precipitate out the desired cyclamate salt. In a preferred embodiment, the aqueous solution is freeze-dried to yield the wanted crystalline derivative. The salts may also be recrystallized if desired, but we found this unnecessary as a critical step, and suitable products can be made without resort to this type of purification.

As noted above, the salts of the invention remain powdery and do not become sticky or appear hygroscopic. The salts in solid form, due to their excellent free-flowing properties, are particularly easy to work up in the dry state on an industrial scale, and are thus easily mixed with other solid adjuncts which one may seek to add.

The sweetening agents of the invention have an exceptionally high intensity of sweetening power. By way of a single comparison, they have roughly a 100–1000% improved sweetening power compared to dextrose, which itself is considered to be high on the scale of sweetening intensity. The salts are roughly detectable by taste in the dilution of one part in 10,000 parts of water. Yet, on the other hand even at relatively high concentrations of the cyclamate salts of the invention they are not accompanied by the undesirable bitterness usually left as an aftertaste in synthetic sweetening materials of this type.

If desired, small proportions of other sweetening agents artificial or natural and/or dietary sweetening agents, for example, arabitol or sorbitol, may also be added to the cyclamates of the invention. The latter substances may particularly serve as moisture retaining agents.

Again, the compositions of the invention may be admixed with still other materials. For example, to the cyclamates defined herein there may be further additives as preservatives, such as benzoic acid and/or para-hydroxy benzoic acid esters, for example, their methyl or propyl esters.

The amino sugars which easily form salts with cyclohexyl sulfamic acid may be chosen from a wide variety of known and available sugars of this type. Thus, the sugar may be a monosaccharide or disaccharide amine derivative or even a higher saccharide in some cases. Amine derivatives of xylose, glucose, mannose, galactose, sorbose, rhamnose, talose, fructose, sucrose, lactose, maltose, etc. may be employed in both the D and L forms. As well, reduction products of any of the foregoing may be employed herein. Further, an amine group may be attached to any carbon atom, thus forming a wide number of isomers useful in this invention. A particularly preferred series of isomers containing amino groups are those of the aldose and ketose series. Reduction products of the just mentioned isomer series are also especially useful here.

Among particularly preferred amino sugars which may be used to form the sought-after salts include amino-glucose, amino-fructose, amino-maltose, amino-sucrose, and amino-lactose, including all isomers of these.

Another particularly preferred group of compounds are those of the reduced sugar type, generically described as amino-deoxy-hexitols. With respect to this group of compounds and any of the others just described, the amino group may be a primary amine or a substituted amine, such as a N-alkyl-amino-deoxy-hexitol. Thus, suitable amino sugars may be formed by reaction of the base sugar with either ammonia, methylamine, ethylamine, isopropylamine, butylamine, etc. The amino group may be substituted with groups other than those of the alkyl type if the resulting amino sugar is still physiologically acceptable. Thus, in addition to N-substituted amino hexitols, suitable amino sugars useful here may be one of the isomers of the N-alkylaminodeoxy aldose or ketose series or others.

Specific amino sugars which may typically be employed here include 1-amino-1-deoxy-glucose, 6-amino-6-deoxy-fructose, 1-amino-1-deoxy-D-fructose, 2-amino-2-deoxy-D-galactose, 2-amino-2-deoxy-D-mannose, 2-amino-2-deoxy-D-talose, 1-(N-methylamino) - 1 - deoxy-D-glucitol, 1-amino-1-deoxy-D-glucitol, 2-amino-2-deoxy-D-glucose, and 6-amino-6-deoxy-D-glucose. Among these just mentioned the latter four materials are preferred, with the most preferred being 1-amino-1-deoxy-D-glucitol.. This compound, also known as glucamine, is simply prepared by a reductive amination of glucose by means of reaction with ammonia followed by reduction with a Raney-Nickel catalyst. The same type of reaction may be run with alkyl amines as the reactant. Another of the preferred material, 2-amino-2-deoxy-D-glucose (glucosamine) is readily available since this is a natural product obtained from chitin.

It should be understood, of course, that the salts of the invention may be prepared by both reaction of the free base of the amino sugar and cyclohexyl sulfamic acid, as well as by reaction of an acid salt of the amino sugar, such as the hydrochloric acid salt, and an organic or inorganic salt of cyclohexyl sulfamic acid, such as the sodium or calcium form.

In still another embodiment of the invention we have found that any one or more of the above cyclamate salts may be mixed with any one or more of the above enumerated amino sugars whereby a wide variety of excellent synthetic sweeteners are provided. Prior to use by the consumer these could be pre-mixed in powder or liquid form.

The following examples illustrate typical preparations of the salts of the invention, and their evaluation as synthetic sweeteners. It is understood, of course, that these examples are merely illustrative and the invention is not to be limited thereto.

EXAMPLE I

Here, a recrystallized sample of 1-amino-1-deoxy-D-glucitol (glucamine) was made. [9.826 g., 5.422 millimoles; I.R. showed no carbonate absorption at 6.3 m$\mu$.] It was poured into a flask which had been first flushed with nitrogen. The glucamine had been previously prepared by reductive amination of D-glucose as described above. 100 ml. of water (previously boiled and cooled under nitrogen) was then added to the flask. To this solution was added 9.718 g. (5.422 millimoles) of cyclohexyl sulfamic acid. The glucamine cyclohexyl sulfamate salt was readily formed and the resultant solution was then freeze-dried to yield a white powder having a melting point of 130–131° C. The optical rotation was $[\alpha]_D^{24}$—9.5° (1% in water). The pH of a 1% solution was 4.00.

The above salt was then recrystallized by dissolving a 15.2 g. portion in 55 ml. of glacial acetic acid by heating to 100° C. The solution was then stored overnight at room temperature. Crystals were collected, washed with some acetic acid-dimethoxyethane, and then triturated with dimethoxyethane and collected on a filter. The air-dried crystals, M.P. 132–133° C. were freeze-dried from an aqueous solution to remove traces of acetic acid. The residue weighed 13.2 g., had a melting point of 130–132° C., and an optical rotation of $[\alpha]_D^{23}$—8.6° (1% in water). The pH of a 1% solution was 4.64.

*Analysis.*—Calcd. for $C_{12}H_{26}N_2O_5S$ (percent): C, 39.99; H, 7.83; N, 7.77; S, 8.90. Found (percent): C, 39.93; H, 7.93; N, 7.68; S, 9.00.

A small sample of the above was recrystallized again and had a melting point of 132.5–133° C. After freeze-drying to completely remove acetic acid, the melting point was 130–133° C. and the sample had an optical rotation of $[\alpha]_D^{23}$—8.5° (1% in water). The pH of a 1% solution was 4.70.

*Analysis.*—Found (percent): C, 40.15; H, 7.90; N, 7.72; S, 8.94. The above powdery samples, even after long periods of exposure to the atmosphere, did not become sticky or appear hygroscopic.

In an improved procedure, the crude glucamine cyclohexyl sulfamate was recrystallized from 10 volumes of ethanol to yield 87% of white crystals, M.P. 132.5–134° C.

The above samples were then subjected to a taste testing panel. The test in this instance had a two-fold objective. The first object was to rate the intensity of sweetness, and the second objective was to determine whether a bitter or other aftertaste existed. The reference sugar which was also tasted was in this case a 0.5 molar dextrose. The reference number for this was arbitrarily set at 10. The glucamine cyclohexyl sulfamates prepared above were then made up in 0.01 molar solutions. About a total of 40 responses rated the glucamine salt as having an average intensity of about 15.

In addition to intensity, the glucamine salts were also rated by the panel as sweet, sour, salty or bitter, with the panelists being asked to give each of the taste qualities a number, the total of which added up to 100. The glucamine salts were rated 90–100 in sweetness, and the vast majority of the panelists indicated there was no aftertaste. In those few cases where an aftertaste was noted, many of the panelists rated the aftertaste as pleasant. This test is even more meaningful in view of the fact that commercial cyclamates are normally utilized at a much lesser concentration, usually 0.001–0.005 M concentration and still impart a bitter aftertaste. Yet it is known, of course, that as one goes up in concentration and sweetening power, bitter aftertaste, if present, is proportionally intensified. Yet the compounds of the present invention even at a ten-fold concentration normally employed exhibited substantially no bitter aftertaste.

At this time it should also be noted that the glucamine salt of saccharin was also prepared and tested by the panel. In this regard it was noted that the glucamine saccharin salt, after about three days exposure to the atmosphere, picked up sufficient moisture so that it became a clear soup. Also, at least with respect to a relative comparison with glucamine cyclamate, the glucamine saccharin was rated as having a marked bitter aftertaste.

EXAMPLE II

Here, another amino sugar salt of cyclohexyl sulfamic acid was prepared. In this instance the 6-amino-6-deoxy-D-glucose cyclohexyl sulfamate was made. Specifically, a solution of 615 mg. (3 millimoles) of an azido glucofuranose was added to 537 mg. (3 millimoles) of cyclohexyl sulfamic acid in 10 ml. of water. 100 mg. of a catalyst of palladium on carbon was added, the mixture stirred under one atmosphere of hydrogen for 20 hours, the catalyst removed and the aqueous solution freeze-dried. The product obtained was a white granular residue in an amount of 920 mg. (86% yield). Complete reduction took place here as indicated by the absence of absorption at 4.7 m$\mu$ (—$N_3$) in the infrared spectrum.

*Analysis.*—Calcd. for $C_{12}H_{26}N_2O_8S$ (percent): C, 40.2; H, 7.31; N, 7.82; S, 8.95. Found (percent): C, 40.1; H, 7.48; N, 7.94; S, 9.07 (calculation corrected for 0.4% ash present). The pH of a 0.01 M aqueous solution was 4.6. The optical rotation was $[\alpha]_D^{24} + 18.8° \pm 0.4°$ (concentration—1% in water).

This material likewise was essentially non-hygroscopic, had excellent sweetening power, and substantially no bitter aftertaste as tested by a panel as described in Example I.

EXAMPLE III

Here, other compounds of the invention were synthesized, and tested as described above. Specifically, glucosamine and N-methyl glucamine were separately reacted with cyclohexyl sulfamic acid to produce salts thereof. Again, each of these had excellent sweetening power, high solubility in water, exhibited substantially no hygroscopicity in solid form, and demonstrated no bitter aftertaste in the majority of cases.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The invention is hereby claimed as follows:

1. A composition of matter useful as a synthetic sweetening agent which comprises an amino mono- or disaccharide salt of N-cyclohexyl sulfamic acid.

2. A composition of matter useful as a synthetic sweetening agent which comprises a salt of N-cyclohexyl sulfamic acid selected from the group consisting of the amino-deoxy-hexitol salt and the lower alkylamino-deoxy-hexitol salt.

3. The composition of claim 1 wherein said amino monosaccharide is an N-lower alkyl-amino isomer of the aldose or ketose series.

4. The composition of claim 1 wherein said amino saccharide is an amino-glucose.

5. The composition of claim 1 wherein said amino saccharide is an amino-fructose.

6. The composition of claim 1 wherein said amino saccharide is an amino-maltose.

7. The composition of claim 1 wherein said amino saccharide is an amino-sucrose.

8. The composition of claim 1 wherein said amino saccharide is an amino-lactose.

9. The composition of claim 1 wherein said amino saccharide is 1-(N-methylamino)-1-deoxy-D-glucitol.

10. The composition of claim 1 wherein said amino saccharide is 1-amino-1-deoxy-D-glucitol.

11. The composition of claim 1 wherein said amino saccharide is 2-amino-2-deoxy-D-glucose.

12. The composition of claim 1 wherein said amino saccharide is 6-amino-6-deoxy-D-glucose.

13. A composition of matter useful as a synthetic sweetening agent which comprises the combination of an amino mono- or disaccharide salt of N-cyclohexyl sulfamic acid, and an amino mono- or disaccharide.

14. A composition of matter useful as a synthetic sweetening agent which comprises the combination of an amino-deoxy-hexitol or lower alkyl-deoxy hexitol salt of N-cyclohexyl sulfamic acid, and an amino mono- or disaccharide.

15. The composition of claim 13 wherein said amino saccharide is 1-(N-methylamino)-1-deoxy-D-glucitol.

16. The composition of claim 13 wherein said amino saccharide is 1-amino-1-deoxy-D-glucitol.

17. The composition of claim 13 wherein said amino saccharide is 2-deoxy-D-glucose.

18. The composition of claim 13 wherein said amino saccharide is 6-amino-6-deoxy-D-glucose.

References Cited

UNITED STATES PATENTS

| | | | |
|---|---|---|---|
| 3,027,363 | 3/1962 | Warner | 260—211 |
| 3,325,475 | 6/1967 | Vacek | 260—211 |

LEWIS GOTTS, Primary Examiner

J. R. BROWN, Assistant Examiner

U.S. Cl. X.R.

99—141; 260—501.21

PO-1050
(5/69)

UNITED STATES PATENT OFFICE
CERTIFICATE OF CORRECTION

Patent No. 3,549,616            Dated December 22, 1970

Inventor(s) Edward McIntosh Acton and Carol Walker Mosher

It is certified that error appears in the above-identified patent and that said Letters Patent are hereby corrected as shown below:

Column 4, line 61, - - soup - - should read - - syrup - -;

Column 6, line 33, in claim 17 - - 2-deoxy-D-glucose - - should read - - 2-amino-deoxy-D-glucose - -.

Signed and sealed this 27th day of April 1971.

(SEAL)
Attest:

EDWARD M. FLETCHER, JR.            WILLIAM E. SCHUYLER, JR.
Attesting Officer                      Commissioner of Patents